(12) United States Patent
Sunderland et al.

(10) Patent No.: US 9,018,288 B2
(45) Date of Patent: Apr. 28, 2015

(54) THERMOPLASTIC COMPOSITION

(75) Inventors: Patrick J. Sunderland, Rossendale (GB); Dean Thetford, Rochdale (GB)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 252 days.

(21) Appl. No.: 12/669,072

(22) PCT Filed: Jul. 31, 2008

(86) PCT No.: PCT/US2008/071712
§ 371 (c)(1),
(2), (4) Date: Jan. 14, 2010

(87) PCT Pub. No.: WO2009/018413
PCT Pub. Date: Feb. 5, 2009

(65) Prior Publication Data
US 2010/0210767 A1 Aug. 19, 2010

Related U.S. Application Data

(60) Provisional application No. 60/953,478, filed on Aug. 2, 2007.

(51) Int. Cl.
C08K 5/16 (2006.01)
C08J 3/22 (2006.01)
C08K 3/00 (2006.01)
C08K 5/17 (2006.01)

(52) U.S. Cl.
CPC .............. *C08J 3/226* (2013.01); *C08J 2423/00* (2013.01); *C08K 3/0033* (2013.01); *C08K 5/175* (2013.01)

(58) Field of Classification Search
CPC ............... C08J 3/20; C08J 3/201; C08J 3/22; C08J 3/226; C08J 2400/22; C08J 2423/00; C08K 5/175; C08K 5/20; C08K 5/16; C08K 5/0041; C08K 3/0033

USPC .................................. 524/186, 238; 106/400
See application file for complete search history.

(56) References Cited

U.S. PATENT DOCUMENTS

| | | | | |
|---|---|---|---|---|
| 3,978,036 A | * | 8/1976 | Pollard | 264/140 |
| 4,165,239 A | * | 8/1979 | Linden et al. | 106/448 |
| 4,217,265 A | * | 8/1980 | Dietz et al. | 524/90 |
| 5,637,635 A | | 6/1997 | Patel | |
| 5,780,401 A | * | 7/1998 | Steckel | 508/551 |
| 6,066,601 A | * | 5/2000 | Steckel | 508/181 |
| 6,231,662 B1 | * | 5/2001 | Atkinson | 106/499 |
| 6,312,822 B1 | * | 11/2001 | Irick et al. | 428/479.6 |
| 6,465,414 B1 | | 10/2002 | Guerin et al. | |
| 6,727,305 B1 | * | 4/2004 | Pavez Aranguiz | 524/423 |
| 6,835,765 B1 | * | 12/2004 | Milan | 524/238 |
| 2006/0111478 A1 | | 5/2006 | Hommer et al. | |

FOREIGN PATENT DOCUMENTS

| | | |
|---|---|---|
| CA | 2 561 215 A1 | 10/2005 |
| EP | 1 595 911 A1 | 11/2005 |
| FR | 2 774 311 A1 | 8/1999 |
| WO | 03/097721 A1 | 11/2003 |
| WO | 2005/097872 A1 | 10/2005 |
| WO | 2007/057326 A1 | 5/2007 |

* cited by examiner

*Primary Examiner* — Satya Sastri
(74) *Attorney, Agent, or Firm* — Teresan W. Gilbert, Esq.; David M. Shold, Esq.

(57) ABSTRACT

The invention relates to a composition containing a particulate solid, a plastic material (such as a thermoplastic polymer) and a compound capable of having dispersant properties. The compound may be obtained/obtainable by reacting (i) a carboxylic acid or anhydride thereof with (ii) an amine or an aminoalcohol, to form a product, wherein the carboxylic acid contains a lipophilic group R containing six or more carbon atoms; and wherein the product formed is derived from a molar ratio of (i) to (ii) is either: (a) 1:1 or greater when (i) is a carboxylic acid anhydride, or (b) ratio of greater than 1:1 when (i) is a carboxylic acid. The invention further relates to novel compounds, and the use of the compound as a dispersant.

8 Claims, No Drawings

THERMOPLASTIC COMPOSITION

CROSS REFERENCE TO RELATED APPLICATION

This application claims priority from PCT Application Ser. No. PCT/US2008/71712 filed on Jul. 31, 2008, which claims the benefit of U.S. Provisional Application No. 60/953,478 filed on Aug. 2, 2007.

FIELD OF INVENTION

The invention relates to a composition containing a particulate solid, a plastic material (such as a thermoplastic polymer) and a compound capable of being a dispersant.

BACKGROUND OF THE INVENTION

Thermoplastics such as PP, PE, etc., are typically coloured using pigment concentrates. The pigment concentrates are often referred to as masterbatches or compounds. These concentrates are prepared by mixing ingredients together and subjecting them to any of the processes commonly used for dispersing particulate solids in a thermoplastic polymer. Compounding or mixing in a twin-screw extruder is one of these processes. Pigment concentrations in masterbatches may contain up to 70% of pigment, and optionally other additives. Other additives may include waxes, dispersants, lubricants and UV stabilizers.

Production of masterbatches typically utilises a pigment dispersed in thermoplastic polymer, i.e., fine particles with limited amounts of aggregates. However, aggregates are known to form from the pigments in the production of masterbatches. The presence of aggregates tends to result in filter blocking of the extruder.

In addition, particular requirements are important for finished articles containing the thermoplastic polymer. The thermoplastic polymer may be in the form of a solid article, a film or fiber. In solid articles, acceptable dispersion of the pigment is necessary in order to maximise colour development, tinctorial strength and reduced speck levels. For films, incomplete dispersion of the pigment may lead to cracking, unwanted light scattering effects and specks. In fibres, incomplete dispersion of the pigment may result in fiber breakage.

U.S. Pat. No. 4,797,400 discloses the use of a polymer containing a carboxylate functionality, e.g., poly(12-hydroxystearic acid) or polyricinoleic acid, as a dispersant in the presence of a particulate solid, a lubricant and a thermoplastic polymer.

Waxes are also known to disperse particulate solids in thermoplastic polymers, see U.S. Patent Application 2002/0151639.

In addition, any technical challenges discussed above, may lead to less efficient processing in expensive extruder-type equipment, causing production costs to increase. Therefore, it would be advantageous to identify a compound capable of dispersing a pigment that also allows for a thermoplastic to have at least one of (i) a reduction in aggregates and specks, (ii) provides a finer state of dispersion, (iii) has acceptable tinctorial strength and has improved brightness, and (iv) faster rates of dispersion. The present invention provides such a compound and compositions thereof.

SUMMARY OF THE INVENTION

In one embodiment, the invention provides a composition comprising a particulate solid, a plastic material (such as a thermoplastic polymer) and a compound, wherein the compound is either:

(A) a mixture of at least one compound of Formula (1) and at least one compound of Formula (2), or (B) a compound of Formula (3), wherein the compound of Formula (1) is selected from the group consisting of Formula (1a) and Formula (1b), wherein the compound of Formula (2) is selected from the group consisting of Formula (2a), Formula (2b) and Formula (2c):

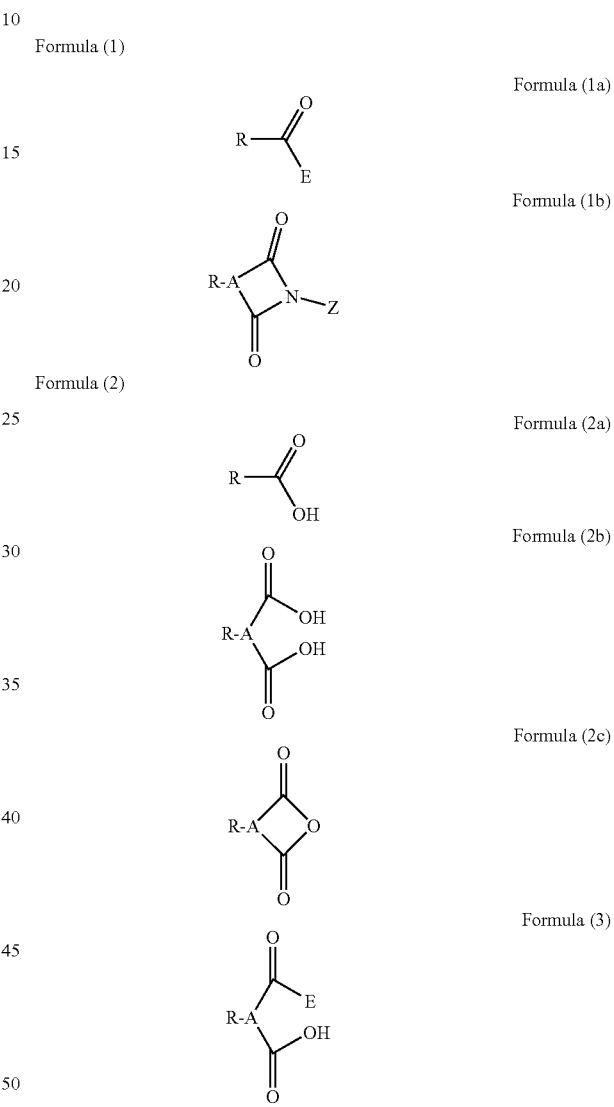

wherein

R is a lipophilic group containing 6 or more carbon atoms;

A is independently hydrocarbylene (typically containing 1 to 8 carbon atoms), or a hydroxy-substituted hydrocarbylene (typically containing 1 to 8 carbon atoms);

E is independently —N(X)Y or —O—W (typically —N(X)Y);

W and Z are independently —(CR'R")$_m$—N(T)V;

R' and R" are independently hydrogen or hydrocarbyl (typically alkyl containing 1 to 10, or 1 to 5 carbon atoms, or 1 carbon atom); in one embodiment both R' and R" are hydrogen;

X and Y are independently hydrogen or —(CR'R")$_m$—N(T)V, with the proviso that at least one of X and Y is —(CR'R")$_m$—N(T)V;

m is 1 to 20, or 1 to 5; and

T and V are independently hydrogen or hydrocarbyl (typically alkyl, and may contain 1 to 5 carbon atoms, or 1 carbon atom).

In one embodiment, the invention provides a composition comprising a particulate solid, a plastic material (such as a thermoplastic polymer) and a compound, wherein the compound is either:

(A) a mixture of at least one compound of Formula (1) and at least one compound of Formula (2), or (B) a compound of Formula (3'), or mixtures thereof, wherein the compound of Formula (1) is selected from the group consisting of Formula (1a) and Formula (1b'), wherein the compound of Formula (2) is selected from the group consisting of (ii) Formula (2a), Formula (2b') and Formula (2c'):

Formula (1)

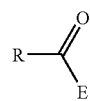
Formula (1a)

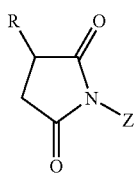
Formula (1b')

Formula (2)

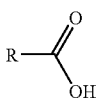
Formula (2a)

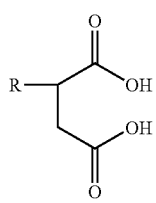
Formula (2b')

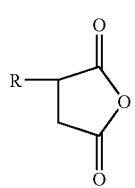
Formula (2c')

Formula (3')

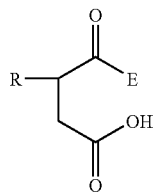
Formula (3a')

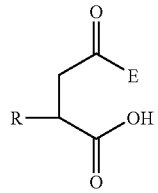
Formula (3b')

wherein R, E, W, X, Y, Z, T, V, R', R" and m are defined the same as above.

In one embodiment, E in the Formulae above is —N(X)Y, m is 1 to 5, and both T and V are hydrogen.

In one embodiment, the invention provides a composition comprising a particulate solid, a plastic material (such as a thermoplastic polymer) and a compound obtained/obtainable by reacting (i) a carboxylic acid or anhydride thereof with (ii) an amine or an aminoalcohol, to form a product, wherein the carboxylic acid contains a lipophilic group R containing six or more carbon atoms; and wherein the product formed is derived from a molar ratio of (i) to (ii) is either:

(a) 1:1 or greater when (i) is a carboxylic acid anhydride, or (b) ratio of greater than 1:1 when (i) is a carboxylic acid.

In one embodiment, the invention provides for the use of a compound of either:

(A) a mixture of at least one compound of Formula (1) and at least one compound of Formula (2) as defined above, or (B) a compound of Formula (3) as defined above, as a dispersant.

In one embodiment, the invention provides for the use of a compound obtained/obtainable by reacting (i) a carboxylic acid or anhydride thereof with (ii) an amine or an aminoalcohol, to form a product, wherein the carboxylic acid contains a lipophilic group R containing six or more carbon atoms; and wherein the product formed is derived from a molar ratio of (i) to (ii) is either:

(a) 1:1 or greater when (i) is a carboxylic acid anhydride, or (b) ratio of greater than 1:1 when (i) is a carboxylic acid.

In one embodiment, the invention provides a compound as is defined above.

In one embodiment, the invention provides for the use of the compound defined above as a dispersant.

In one embodiment, the invention provides for the use of the compound defined above as a dispersant in the composition disclosed herein.

DETAILED DESCRIPTION OF THE INVENTION

The present invention provides a composition as disclosed herein above.

In one embodiment, the invention provides a composition comprising a particulate solid, a plastic material (such as a thermoplastic polymer) and a compound obtained/obtainable by reacting (i) a carboxylic acid or anhydride thereof with (ii) an amine or an aminoalcohol, to form a product, wherein the carboxylic acid contains a lipophilic group R containing six or more carbon atoms; and wherein the product formed is derived from a molar ratio of (i) to (ii) is either:

(a) 1:1 or greater when (i) is a carboxylic acid anhydride, or (b) ratio of greater than 1:1 when (i) is a carboxylic acid.

The molar ratio of (i) to (ii) may be greater than 1:1 to 10:1, or 1.1: to 6:1 or 1.5:1 to 4:1.

The mole stoichiometry typically results in a compound that is either (i) a mixture of compounds, wherein one compound has carboxylic acid or anhydride functionality, and wherein a second compound has at least one amino group, or (ii) a compound with both carboxylic acid or anhydride functionality and at least one amino group.

The reaction of (i) and (ii) may be carried out at a temperature of 40° C. to 140° C., or 60° C. to 110° C.

The carboxylic acid may be acylating agent (such as an anhydride), a fatty acid, a hydroxy carboxylic acid (typically a hydroxy-$C_{8-20}$-alkenylene carboxylic acid), or mixtures thereof.

The carboxylic acid contains a lipophilic group R containing six or more carbon atoms. In different embodiments, the lipophilic group R contains at least 10 or at least 12 carbon atoms. The upper limit on the number of carbon atoms for R may be 300, 400 or 500.

In different embodiments, R is independently a $C_{6-500}$, $C_{10-400}$, $C_{10-300}$, or $C_{12-500}$ alk(en)yl group.

The $C_{12-500}$ alk(en)yl group typically includes polyisobutylene groups. The polyisobutylene may have a number average molecular weight of 450 or 550 to 5000, or 750 to 3000, or 900 to 2500. In different embodiments, the polyisobutylene number average molecular weight may be 950-1000, or 2200-2300.

Examples of suitable fatty acids include oleic acid, palmitic acid, stearic acid, erucic acid, behenic acid, arachidic acid, arachidonic acid, lauric acid, 2-ethylhexanoic acid, ricinoleic acid, 12-hydroxystearic acid, 9,11-linoleic acid, 9,12-linoleic acid, 9,12,15-linolenic acid, abietic acid, or mixtures thereof. Other examples of fatty acids include mixtures of fatty acids derived from oils from naturally occurring sources such as sunflower oil, olive oil, rapeseed oil, castor oil, palm oil, coconut oil, linseed oil, soya bean oil, fish oil and the like, in either a hydrogenated (saturated) or unsaturated form. Further examples of fatty acids include the Unicid® acids (linear primary synthetic carboxylic acids) commercially available from Baker Petrolite Polymer Division.

In one embodiment, the compound may also be derived from a hydroxy carboxylic acid, or derivatives thereof.

In one embodiment, suitable examples of hydroxy carboxylic acids include ricinoleic acid, 12-hydroxystearic acid, 6-hydroxy caproic acid, 5-hydroxy valeric acid, 12-hydroxy dodecanoic acid, 5-hydroxy dodecanoic acid, 5-hydroxy decanoic acid, 4-hydroxy decanoic acid, 10-hydroxy undecanoic acid, or mixtures thereof.

Useful derivatives of hydroxy carboxylic acids may be utilised from a number of other hydroxy carboxylic acids. Examples of hydroxy carboxylic acids include citric acid, tartaric acid, malic acid (or hydroxy-succinic acid), lactic acid, oxalic acid, glycolic acid, hydroxy-propionic acid, hydroxyglutaric acid, various other dihydroxy mono-acids, various other mono-hydroxy diacids, or mixtures thereof. These hydroxy carboxylic acids may be further substituted with an R group as defined above. The R group may be for instance an ester group on one of the carboxylic acids, or bonded to the carboxylic acid through a carbon to carbon bond.

In one embodiment, the amine has at least two amino groups. One of the amino groups reacts with the carboxylic acid or anhydride. Other amino groups may remain unreacted. Unreacted amino groups may be primary, secondary or tertiary. In one embodiment, unreacted amino groups may be secondary or tertiary.

Examples of a suitable amine from which the compound may be derived include N,N-dimethyl-aminopropylamine, N,N-diethyl-aminopropylamine, N,N-dimethyl-aminoethylamine, N,N-diethyl-aminoethylamine, ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene)triamine, the diaminobenzenes, the diaminopyridines, aminopyridines, aminopiperidines, aminopropylimidazole, or mixtures thereof.

Examples of a suitable aminoalcohol from which the compound may be derived include ethanolamine, isopropanolamine, diethanolamine, triethanolamine, diethylethanolamine, dimethylethanolamine, dibutylethanolamine, 3-amino-1,2-propanediol, serinol, 2-amino-2-methyl-1,3-propanediol, tris(hydroxymethyl)-aminomethane, N-methylglucamine, 1-amino-1-deoxy-D-sorbitol, diisopropanolamine, N-methyl-N,N-diethanol amine, N,N,N',N'-tetrakis(2-hydroxy-propyl)ethylenediamine, 2-amino-2-methyl-1-propanol, 2-dimethylamino-methyl-1-propanediol, 2-amino-1-butanol, 2-amino-2-ethyl-1,3-propanediol, 2-amino-2-methyl-1,3-propanediol, or mixtures thereof.

In one embodiment, the aminoalcohol includes dimethylaminoethanol, diethylaminoethanol, dimethylaminopropanol, or mixtures thereof.

The compound may be derived from an alkenyl-substituted acylating agent e.g., dodecyl succinic anhydride, hexadecyl succinic anhydride, octadecyl succinic anhydride, dodecenyl succinic anhydride, hexadecenyl succinic anhydride, octadecenyl succinic anhydride, polyisobutylene succinic anhydride, or mixtures thereof.

The compound formed by the process, may also be represented by Formulae (1), (2) and (3) as described above.

In compounds of Formulae (1b), (2b), (2c) and (3) examples of a suitable group represented by A include ethylene, propylene, tetramethylene, hexamethylene and 2-hydroxytrimethylene. When A is ethylene in compounds of Formulae (1b), (2b), (2c) and (3), the resultant compound may be represented by (1b'), (2b'), (2c') and (3') (i.e., (3a') and (3b')) as shown above.

INDUSTRIAL APPLICATION

In one embodiment, the compound as described herein is a processing aid or dispersant.

The compound in different embodiments may be present in the composition of the invention in a range selected from 0.1 to 50 wt. %, or 0.25 to 35 wt. %, and 0.5 to 30 wt. %.

The particulate solid present in the composition may be any inorganic or organic solid material. In one embodiment, the particulate solid is a pigment.

In one embodiment, the particulate solid is an organic pigment from any of the recognised classes of pigments described, for example, in the Third Edition of the Colour Index (1971) and subsequent revisions of, and supplements thereto, under the chapter headed "Pigments".

Examples of organic pigments are those from the azo, disazo, condensed azo, thioindigo, indanthrone, isoindanthrone, anthantlirone, anthraquinone, isodibenzanthrone, triphendioxazine, quinacridone and phthalocyanine series, especially copper phthalocyanine and its nuclear halogenated derivatives, and also lakes of acid, basic and mordant dyes, and carbon black. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones and carbon black.

Inorganic solids include: extenders and fillers such as talc, kaolin, silica, barytes and chalk, flame-retardant fillers such as alumina trihydrate, or magnesium hydroxide; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g., gamma-$Fe_2O_3$, $Fe_3O_4$, and cobalt-doped iron oxides, calcium oxide, ferrites, especially barium ferrites; and metal particles, especially metallic iron, nickel, cobalt, copper and alloys thereof.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods.

Examples of a suitable thermoplastics include (low density, or linear low density or high density) polyethylene, polypropylene, polystyrene, polyethylene terephthalate (PET), polybutylene terephthalate (PBT), nylon 6, nylon 66, nylon 46, polymethylmethacrylate, polyethersulphone, polycarbonate, polyvinyl chloride (PVC), thermoplastic polyurethane, ethylene vinyl acetate (EVA), Victrex PEEK™ polymers (such as oxy-1,4-phenylenoeoxy-1,4-phenylenecarbonyl-1,4-phenylene polymers) and acrylonitrile butadiene styrene polymers (ABS); and various other polymeric blends or alloys.

The compositions typically contain from 1 to 95% by weight of the particulate solid, the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The composition may include other ingredients such as antioxidants, antistatic agents, coupling agents, foaming agents, mould-release agents, plasticisers, slip agents, UV stabilisers, viscosity depressants, dispersants other than the compound of the present invention, and air-release agents.

The composition may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by twin-screw extrusion, twin-roll milling, compounding in a Buss co-kneader, or similar equipment.

In one embodiment, the composition of the invention further includes one or more additional known dispersants.

In one embodiment, the invention provides a composition comprising:
(a) 0.1 to 50 wt. %, or 0.25 to 35 wt. %, and 0.5 to 30 wt. % of the compound disclosed above;
(b) 0 to 90 wt. % of an amorphous poly-α-olefin, such as a polyethylene/polypropylene mixture;
(c) 0 to 90 wt. % of a wax, typically a polyolefin wax, such as a polyethylene wax; and
(d) 0 to 30 wt. % of a crystalline polyolefin.

In one embodiment, the invention provides a composition comprising:
(a) 0.1 to 50 wt. %, or 0.25 to 35 wt. %, and 0.5 to 30 wt. % of the compound disclosed above;
(b) 0 to 90 wt. % of an amorphous poly-α-olefin such as a polyethylene/polypropylene mixture;
(c) 0 to 90 wt. % of a wax, typically a polyolefin wax such as a polyethylene wax; and
(d) 0 to 30 wt. % of a crystalline polyolefin,
with the proviso that at least one of (b) and (c) is present at 0.1 wt. % or more.

The polyolefin wax (such as a polyethylene wax) may be described as a carrier, co-agent or synergist.

In one embodiment, the invention provides for a micronised composition as is described herein. In one embodiment, the composition further comprising at least one of either (i) an amorphous poly-α-olefin, or (ii) polyolefin wax, has a particle size fraction of at least 10 wt % having a diameter of 1 mm or less, or 0.5 mm or less, or 0.1 mm or less, or 0.05 mm or less. In one embodiment, the particle size fraction may be 50 nm to 1 mm, or 100 nm to 0.05 mm.

The following examples provide illustrations of the invention. These examples are non exhaustive and are not intended to limit the scope of the invention.

EXAMPLES

Comparative Dispersant A (ComparA): Polyhydroxystearic acid (Mn of about 850) is heated in a vessel until molten. Sasol C105, Fischer Tropsch wax (650 parts, ex. Sasol Wax GmbH, (solidifying point: 104°-110° C.; mean molecular weight: 1262; average molecular formula: $C_{90}H_{182}$) is then added in portions to the polyhydroxystearic acid, maintaining a stirrable mass to form a mixture. The mixture is stirred with heating until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

Intermediate 1: Hexadecenylsuccinic anhydride (120 parts, ex. Lubrizol) is melted in a vessel at 80° C. Dimethylaminopropylamine (38 parts, Ex. Aldrich) is added and stirring continued for one hour under nitrogen. The reaction temperature is increased to 160° C. and stirring continued for a further 10 hours whilst water was collected by a Dean Stark apparatus. The product is cooled.

Comparative Dispersant B (ComparB): Intermediate 1 (70 parts) is heated in a vessel until molten. Sasol C105, Fischer Tropsch wax (130 parts) is added in portions with heating, maintaining a stirrable reaction mass to form a mixture. The mixture is stirred with heating until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

Intermediate 2: Hexadecenylsuccinic anhydride (100 parts, ex. Lubrizol) is melted at 80° C. Distilled water (4 parts) is then added, followed by stirring for two hours in a nitrogen atmosphere. The product is cooled.

Comparative Dispersant C (ComparC): Intermediate 2 (70 parts) is heated in a vessel until molten. Sasol C105, Fischer Tropsch wax (130 parts) is added in portions, maintaining a stirrable reaction mass to form a mixture. The mixture is stirred with heating until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

Comparative Dispersant D (ComparD): Hexadecenylsuccinic anhydride (70 parts parts, ex. Lubrizol) is heated in a vessel until molten. Sasol C 105, Fischer Tropsch wax (130 parts) is added in portions, maintaining a stirrable reaction mass to form a mixture. The mixture is stirred with heating until a homogeneous liquid is obtained. The homogeneous liquid is poured into a second vessel and allowed to cool. Once solidified, the material is cooled to $-10°$ C. for 2 hours, before breaking into individual pieces of about 2 cm. The material is then milled on a Glen Creston rotary pin mill, without a sieve screen, to produce a fine granule.

Intermediate 3: Polyhydroxystearic acid (Mn 850), 200 parts and 3-dimethylamino-1-propylamine (12.5 parts, Ex. Aldrich Chemical Co.) are stirred together in a vessel under nitrogen atmosphere at 100° C. for 30 minutes. The temperature is raised to 130° C. and stirring continued at this temperature for 18 hours, before cooling. The Acid value of the resulting brown viscous oil is 36 mg KOH/g.

Dispersant E (DispE): Intermediate 3 (70 parts) is heated in a vessel until molten. Sasol C105, Fischer Tropsch wax (130 parts) is added in stages to the stirring mass, maintaining a stirrable reaction mass to form a mixture. The mixture is stirred with heating for two hours until a homogeneous liquid is obtained. The homogeneous liquid is poured into a second vessel and allowed to cool. Once solidified, the material is cooled to $-10°$ C. for 2 hours, before breaking into individual pieces of about 2 cm. The material is then milled on a Glen Creston rotary pin mill, without a sieve screen, to produce a fine granule.

The material is then milled on a Glen Creston rotary pin mill, without a sieve screen, to produce a fine granule.

Intermediate 4: Hexadecenylsuccinic anhydride (100 parts, ex. Lubrizol) is melted at 80° C. 3-3'-Imino-bis-(N,N-dimethylaminopropylamine) (58 parts, Ex. Aldrich) is added and stirring continued at 80° C. for two hours under a nitrogen atmosphere. The reaction temperature is increased to 160° C. and stirring continued for a further 10 hours before cooling.

Dispersant H (DispH): Intermediate 4 (70 parts) is heated in a vessel until molten. Sasol C105, Fischer Tropsch wax (130 parts) is added in stages to the stirring mass, maintaining a stirrable reaction mass to form a mixture. The mixture is stirred with heating for two hours until a homogeneous liquid is obtained. The homogeneous liquid is poured into a second vessel and allowed to cool. Once solidified, the material is cooled to $-10°$ C. for 2 hours, before breaking into individual pieces of about 2 cm. The material is then milled on a Glen Creston rotary pin mill, without a sieve screen, to produce a fine granule.

Dispersant Evaluation: Each of the dispersants (60 parts) is charged to a Henschel mixer with Heuco Green 600703K (Pigment Green 7, 200 parts) and LDPE pellets (Exxon Mobil LD600 240 parts). The materials are blended together for 60 seconds to form a premix. This premix is compounded through a Thermo Prism TSE16TC twin screw extruder, with a screen pack profile of 400/60 mesh. The temperature profile for the extruder zones is 60/130/140/160/160 from feeder to die. The pressure in bar behind the screen pack is recorded digitally. The pressure data, taken at 100 second intervals, is presented in the table below. The letters OP in the table indicate that the pressure behind the screen pack is greater than 100 bar, the over-pressure limit of the extruder.

| Dispersant | Filter Pack Pressure in Bar | | | | | | | | | |
|---|---|---|---|---|---|---|---|---|---|---|
| | 100 s | 200 s | 300 s | 400 s | 500 s | 600 s | 700 s | 800 s | 900 s | 1000 s |
| ComparA | 61 | 72 | 79 | 85 | 90 | 93 | 95 | OP | OP | OP |
| ComparB | 52 | 65 | 77 | 86 | 95 | OP | OP | OP | OP | OP |
| ComparC | 27 | 36 | 41 | 47 | 52 | 57 | 72 | OP | OP | OP |
| ComparD | 50 | 55 | 58 | 57 | 65 | 74 | 73 | 70 | 79 | OP |
| DispE | 30 | 41 | 44 | 47 | 53 | 46 | 66 | 71 | 84 | 87 |
| DispF | 32 | 35 | 39 | 42 | 45 | 49 | 54 | 59 | 66 | 84 |
| DispG | 30 | 35 | 40 | 42 | 44 | 45 | 48 | 54 | 58 | 65 |
| DispH | 41 | 49 | 49 | 52 | 57 | 59 | 61 | 59 | 73 | 79 |

Dispersant F (DispF): Intermediate 1 (35 parts) and Intermediate 2 (35 parts) are heated together whilst stirring at 80° C. for one hour. Sasol C105 (130 parts) is added in stages to the stirring mass, maintaining a stirrable reaction mass to form a mixture. The mixture is stirred with heating for two hours until a homogeneous liquid is obtained. The homogeneous liquid is poured into a second vessel and allowed to cool. Once solidified, the material is cooled to $-10°$ C. for 2 hours, before breaking into individual pieces of about 2 cm. The material is then milled on a Glen Creston rotary pin mill, without a sieve screen, to produce a fine granule.

Dispersant G (DispG): Hexadecenylsuccinic anhydride (35 parts, ex. Lubrizol) and Intermediate 1 (35 parts) are heated together whilst stirring at 80° C. for one hour. Sasol C105, Fischer Tropsch wax (130 parts) is added in stages to the stirring mass, maintaining a stirrable reaction mass to form a mixture. The mixture is stirred with heating for two hours until a homogeneous liquid is obtained. The homogeneous liquid is poured into a second vessel and allowed to cool. Once solidified, the material is cooled to $-10°$ C. for 2 hours, before breaking into individual pieces of about 2 cm.

Flame Retardant Examples. It is anticipated that particulate flame retardants could be substituted for similar amounts of pigments in the previous dispersant evaluation and would result in comparable results on filter pack pressures and in flame retardant plastic formulations or master-batches. Flame retardants could be any of those mentioned in paragraph 0042 and/or melamine or melamine derivatives, such as melamine cyanurate. Thermoplastics used could be LDPE or any of those mentioned in paragraph 0044.

Intermediate 5: 12-Hydroxystearic acid (200 parts) and 3-dimethylamino-1-propylamine (12.5 parts, Ex. Aldrich Chemical Co.) are stirred together in a vessel under nitrogen atmosphere at 120° C. for 1 hour. The temperature is raised to 180° C. and stirring continued at this temperature for 18 hours, before cooling. The acid value of the resulting brown viscous oil is 5 mg KOH/g.

Dispersant I (DispI): Intermediate 5 (56 parts) and polyhydroxystearic acid (Mn850) (14 parts) are heated together whilst stirring at 80° C. for one hour. Sasol C105, Fischer Tropsch wax (130 parts) is added in stages to the stirring mass, maintaining a stirrable reaction mass to form a mixture.

The mixture is stirred with heating for two hours until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

Dispersant J (DispJ): The procedure for Disp I is repeated except 42 parts of Intermediate 5 and 28 parts of polyhydroxystearic acid (Mn850) are used.

Dispersant K (DispK): The procedure for Disp I is repeated except 28 parts of Intermediate 5 and 42 parts of polyhydroxystearic acid (Mn850) are used.

Dispersant L (DispL): The procedure for Disp I is repeated except 14 parts of Intermediate 5 and 56 parts of polyhydroxystearic acid (Mn850) are used.

Comparative Dispersant E (ComparE): Intermediate 5 (70 parts) is heated in a vessel until molten. Sasol C105, Fischer Tropsch wax (130 parts) is added in stages to the stirring mass, maintaining a stirrable reaction mass to form a mixture. The mixture is stirred with heating for two hours until a homogeneous liquid is obtained. The homogeneous liquid is poured into a second vessel and allowed to cool. Once solidified, the material is cooled to −10° C. for 2 hours, before breaking into individual pieces of about 2 cm. The material is then milled on a Glen Creston rotary pin mill, without a sieve screen, to produce a fine granule.

TESTING

Masterbatch Preparation: Each of the dispersants (60 parts) is charged to a Henschel mixer with Heuco Green 600703K (Pigment Green 7, 200 parts) and LDPE pellets (Exxon Mobil LD600 powder 240 parts). The materials are blended together for 60 seconds to form a premix. This premix is compounded through a Thermo Prism TSE16TC twin screw extruder, with a screen pack profile of 400/60 mesh. The temperature profile for the extruder zones is 60/130/140/160/160 from feeder to die. The pressure in bar behind the screen pack is recorded digitally, and the pressure after 900 seconds is presented in the table below. In order to give material for colour strength measurement the extruder screws are stopped, the filter pack completely removed and the screws restarted, thus allowing material with full pigment charge to be collected.

Letdown Preparation: Evaluation of the masterbatches thus prepared are performed on a Polymix 110L two-roll mill equipped with polished chrome rollers. The roller temperatures are 115° C. on the front roller and 85° C. on the rear roller. Exxon Mobil LD605BA pellets (96 parts) are put into the "nip" of the mill and allowed to heat for 1 minute. Roller rotation was started at 5 rpm and the polymer allowed to form a band by increasing speed to 10 rpm and decreasing the nip setting to 0.75 mm. Plaswhite PE7024 white LDPE masterbatch (60% $TiO_2$, 3.33 parts) was added to the nip, roller speed increased to 20 rpm and mixed into the base polymer by manually manipulating the material from side to side, mixing for approx 1 minute. Each of the masterbatches prepared in the paragraph above (0.5 parts) was added to the nip, roller speed increased to 30 rpm, and mixed in the same way for 3 minutes. The polymer is then stripped from the rolls, rolled into a ball and passed through the nip at 0.75 mm. This is repeated 10 times to give a high level dispersion.

Sample Pressing and Colour Measurement: Of the hide thus prepared, (10) parts is placed in a stencil inside a Bridge hydraulic press. The material was pre-warmed for 3 minutes at 160° C. temp and then pressed under heating for 30 seconds at 1600 psi pressure. Cooling water is then started to allow the sample to cool to 60 degrees C. The material is removed and the colouristic properties measured on a DataColour Spectrophotometer. This is quoted as the colour strength in % compared to a standard (Comparative Sample A) which is set at 100.

TEST RESULTS

| Sample Name | Max Filter Pressure, bar | Colour Strength, % |
| --- | --- | --- |
| Compar A | 95 | 100 |
| Compar E | 95 | Not tested |
| DispF | 89 | 105.2 |
| DispG | 65 | 108.3 |
| DispI | 77 | 107.7 |
| DispJ | 76 | 108.7 |
| DispK | 77 | 109.1 |
| DispL | 72 | 109.8 |

The data obtained from the tests indicates that the compositions of the invention have acceptable performance after more than one thousand seconds. Accordingly, the composition of the present invention is capable of dispersing a pigment that also allows for a thermoplastic to have at least one of a reduction in aggregates and specks, provides a finer state of dispersion, has acceptable tinctorial strength, and has improved brightness and faster rates of dispersion.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A solid article or a fiber composition comprising:
   1 to 95% by weight of a particulate solid,
   a thermoplastic polymer selected from the group consisting of low density polyethylene, linear low density polyethylene, high density polyethylene, polypropylene, polystyrene, polyethylene terephthalate, polybutylene terephthalate, nylon 6, nylon 66, nylon 46, polyethersulphone, polycarbonate, polyvinyl chloride, thermoplastic polyurethane, ethylene vinyl acetate, acrylonitrile butadiene styrene polymers and combinations thereof, and
   a compound obtained by reacting (i) a carboxylic acid or anhydride thereof with (ii) an amine or an aminoalcohol, to form a product, wherein the carboxylic acid contains a lipophilic group R containing six or more carbon atoms, wherein said amine has at least two amino groups, and wherein a residue of said aminoalcohol when reacted with said carboxylic acid is of the formula —O—W, wherein W is of the formula —(CR'R")$_m$—N(T)V wherein R', R", T, and V are independently hydrogen or hydrocarbyl, m is from 1 to 20; and wherein the product formed is derived from a molar ratio of (i) to (ii) is 1.5:1 to 4:1, and wherein the molar ratio of (i) to (ii) results in:

a mixture of compounds, wherein one compound has carboxylic acid or anhydride functionality, and wherein a second compound has at least one amino group, or a compound with both carboxylic acid and at least one amino group.

2. The composition of claim 1, wherein said amine or aminoalcohol comprises an amine and said amine when reacted with said carboxylic acid results in a) an imide residue of the amine of the formula N—Z where —Z is —(CR'R")$_m$—N(T)V and wherein R', R", T, and V are independently hydrogen or hydrocarbyl, and m is from 1 to 20; or b) an amide residue of the formula —N(X)Y where X and Y are independently hydrogen or —(CR'R")$_m$—N(T)V wherein R', R", T, and V are independently hydrogen or hydrocarbyl, and m is from 1 to 20.

3. The composition of claim 1, wherein the particulate solid is a pigment, a filler, or other particulate additive.

4. The composition of claim 1, wherein the compound is present at a range of 0.5 to 30 wt. % of the composition.

5. The composition of claim 1, wherein the compound is present at 0.1 to 50 wt. % of the composition, and wherein the composition further comprises;

(a) 0 to 90 wt. % of an amorphous poly-α-olefin;
(b) 0 to 90 wt. % of a wax; and
(c) 0 to 30 wt. % of a crystalline polyolefin, with the proviso that at least one of (a) and (b) is present at 0.1 wt. % or more.

6. The composition of claim 5, wherein at least 10 wt. % of the composition has a particle size fraction of 0.05 mm or less.

7. The composition of claim 5, wherein at least 10 wt. % of the composition has a particle size fraction of 100 nm to 0.05 mm.

8. The composition of claim 2, wherein the compound is present at 0.1 to 50 wt. % of the composition, and wherein the composition further comprises;

(a) 0 to 90 wt. % of an amorphous poly-α-olefin;
(b) 0 to 90 wt. % of a wax; and
(c) 0 to 30 wt. % of a crystalline polyolefin, with the proviso that at least one of (a) and (b) is present at 0.1 wt. % or more.

* * * * *